Dec. 1, 1959  R. DE LA TRAMERYE ET AL  2,915,132
MOTOR VEHICLE WITH ARTICULATED BODY SECTIONS
TO FACILITATE PARKING
Filed June 14, 1955  4 Sheets-Sheet 1
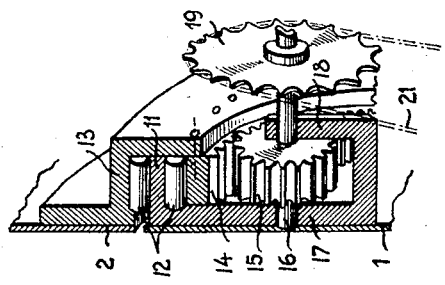
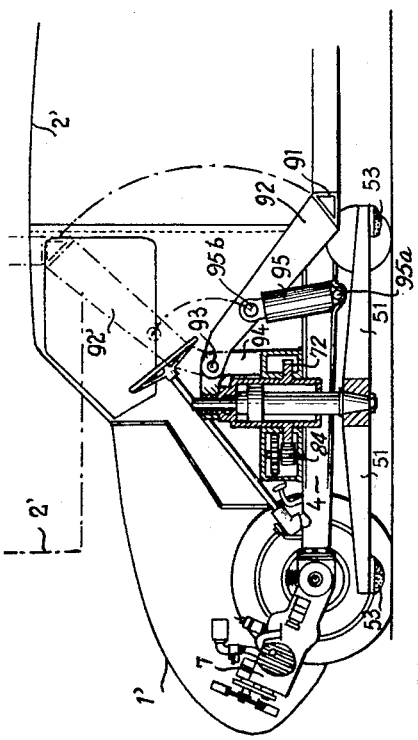
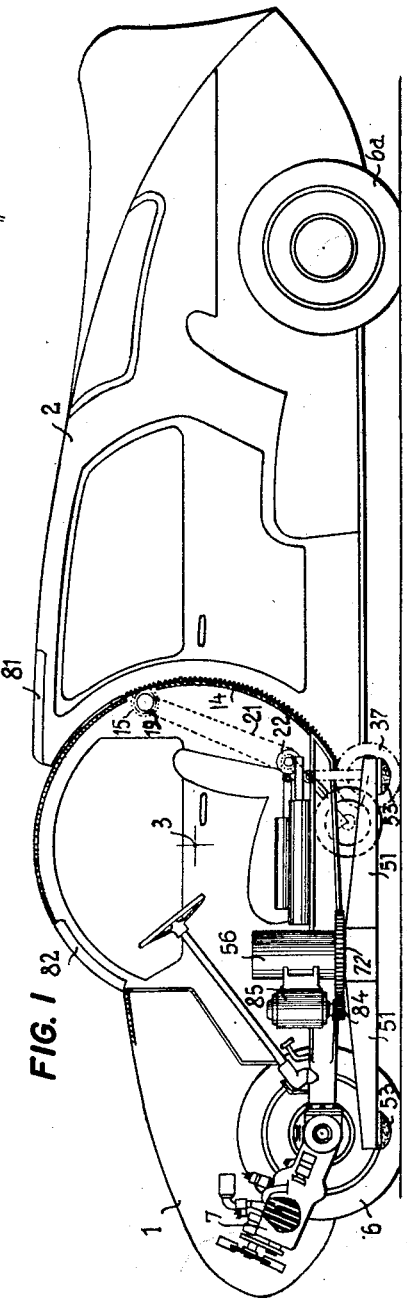
Inventors
R. de la Tramerye
J. Hebert
By Glascock Downing Seebold
Attys.

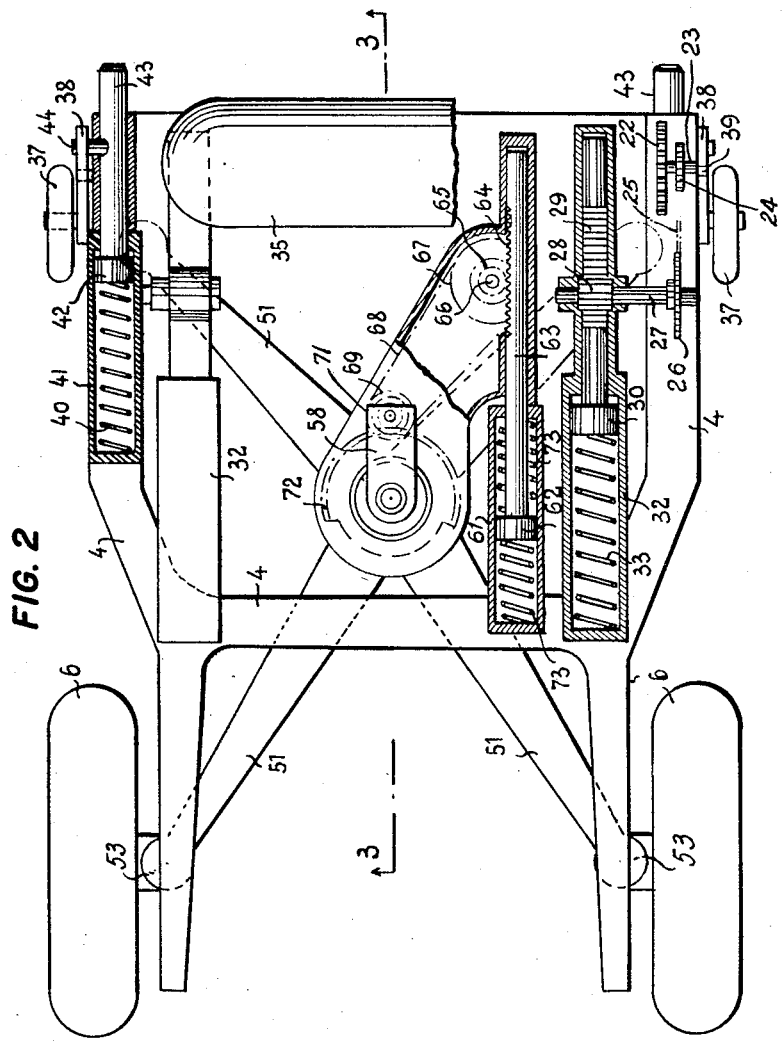

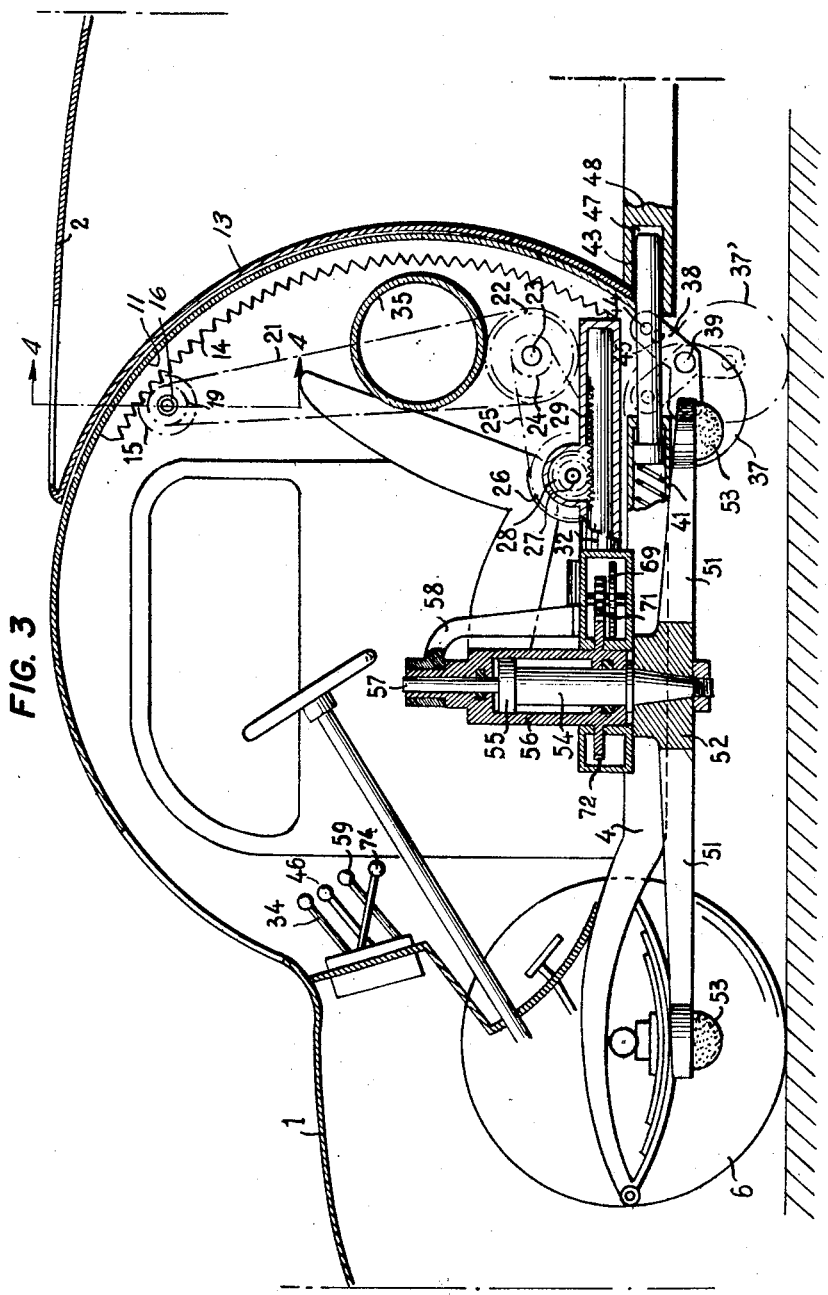

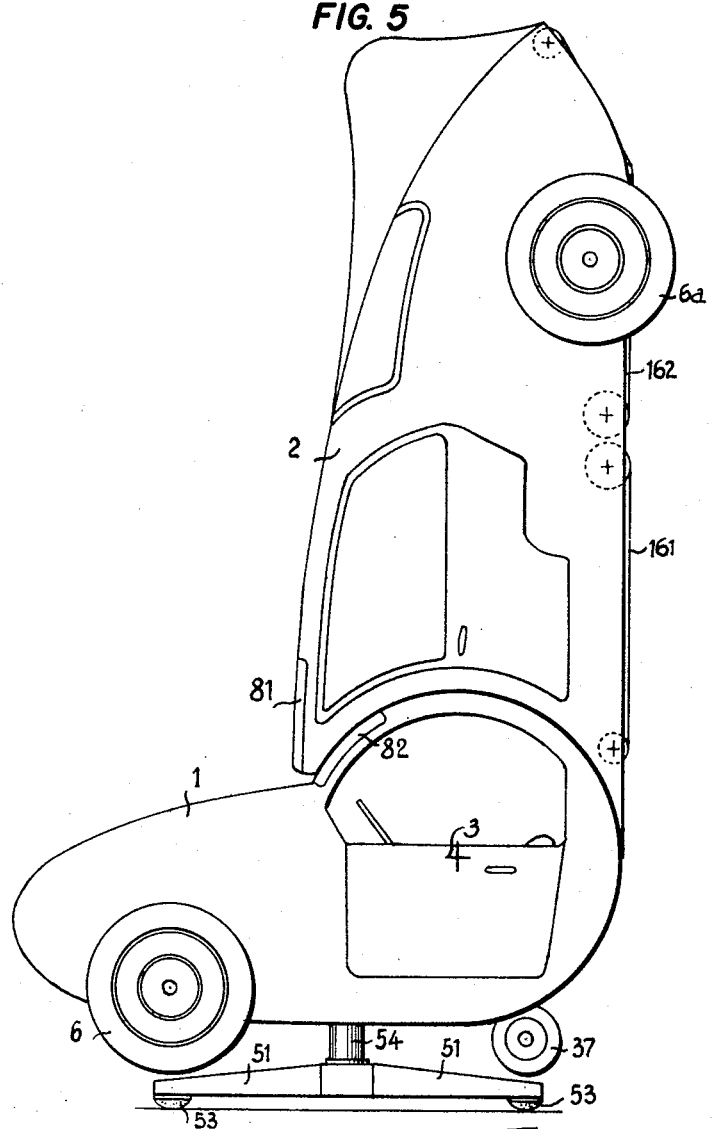

United States Patent Office 2,915,132
Patented Dec. 1, 1959

2,915,132

MOTOR VEHICLE WITH ARTICULATED BODY SECTIONS TO FACILITATE PARKING

Raymond de la Tramerye, Paris, and Jacques Hébert, Fere-en-Tardenois, France

Application June 14, 1955, Serial No. 515,437

Claims priority, application France August 19, 1954

2 Claims. (Cl. 180—1)

The present invention relates to a vehicle of an entirely new design adapted to meet particular requirements as hereinunder set forth.

One object of the invention is to provide a road vehicle, the length of which may be temporarily reduced to a considerable extent for parking or the like purposes.

A more particular object of the invention is therefore to provide a vehicle which may be temporarily raised as a whole so as to stand in a vertical position for parking purposes.

A further object of the invention is to provide a vehicle, the length of which may be temporarily reduced to a considerable extent and which, under such conditions is capable of being moved about in every direction for parking purposes, including turning in its own length.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Figure 1 is a longitudinal sectional view of a first embodiment, the vehicle being shown in driving position.

Figure 2 is an enlarged plan view of the front portion of the vehicle, shown in Figure 1, with parts broken away.

Figure 3 is a vertical sectional view along line 3—3 of Figure 2.

Figure 4 is a perspective view taken on the line 4—4 of Fig. 3, with parts broken away, of a detail of the raising control mechanism of the vehicle shown in Figure 1.

Figure 5 is an elevational view from outside of the vehicle of Figure 1, shown in parking position, and Figure 6 is a vertical sectional view similar to Figure 3 of an alternative embodiment of the raising control mechanism.

In the embodiment shown in Figures 1 to 5, the motor car according to the invention comprises two main portions, namely, a front portion 1 intended to remain in a horizontal position and a rearward portion 2 capable of pivoting, with respect to the portion 1, around a horizontal axis, as shown at 3 in Figure 1, in order selectively to assume either the driving horizontal position shown in Figure 1 or the parking vertical position shown in Figure 5.

The front portion 1 comprises a chassis 4 supported at its front end by two steerable wheels 6 powered by a suitable engine diagrammatically shown at 7. The transmission to these wheels will not be described, as it may be designed in any suitable conventional manner.

The articulation between the two portions of the motor car is ensured on either side of the same by an arcuate anchoring member 11 (Figure 4), concentric with the axis 3, and secured to the front portion 1 of the motor car. The anchoring member 11 comprises two guide surfaces, on which anti-friction rollers 12 are adapted to roll and support a segmental gear 13 secured to the rear portion of the vehicle, and having an internal rack 14 adapted to engage in meshing relation with a pinion 15 fast on a shaft 16 journalled in two wall portions 17, 18 of the anchoring member 11. On the shaft 16 is also keyed a sprocket wheel 19 interconnected through a chain 21 with another sprocket wheel 22 (Figures 1 and 3), the diameter of which is greater than that of the wheel 19. The wheel 22 is keyed on a shaft 23 which is also journalled in a bearing (not shown) on the front portion 1 of the motor car. A chain pinion 24 fast on shaft 23, is interconnected through a chain 25 with a sprocket wheel 26 of larger diameter.

The sprocket wheel 26 is keyed together with a pinion 28 on a shaft 27 and the pinion 28 meshes with a rack 29, the teeth of which are formed in the rod of a piston 30 slidably mounted in a cylinder 32 fixedly secured on the chassis 4. The cylinder 32 and the piston 30 constitute a hydraulic jack for raising the rear portion of the vehicle. In the cylinder 32 is housed a compression spring 33 for urging the piston 30 towards the end of its working stroke, the action of said spring being slightly less than that of the weight of the rear portion of the vehicle.

As previously mentioned, there is provided such a control mechanism on either side of the vehicle and two cylinders, such as 32, therefore, are provided on the chassis 4 of the front portion of the vehicle. These cylinders are connected, through a duct and a suitable sliding valve, the control lever of which is shown at 34 (Figure 3), to a suitable source of pressure fluid, such as an oleo-pneumatic accumulator assembly 35.

It will be easily understood that it is possible, by mere actuation of the lever 34 to cause the raising of the rear portion 2 of the vehicle. The raising is determined by a pivoting motion around the horizontal axis 3 under the action of the hydraulic jack 30, 32 and of the above described mechanism including the pinion and rack gear 28, 29, the chains 25 and 21 and the pinion and pinion 15—14.

The device which serves as a support for the front portion of the vehicle, when the rear portion is raised, will now be described. This device comprises, on the one hand, two additional wheels, on which the vehicle is supported for rolling movement in its raised position, and, on the other hand, a pivoted support adapted to rest on the ground, when required, in order to lift the vehicle as a whole and allow the vehicle to turn in its own length on the support.

The two additional wheels 37 are clearly shown in the drawings. Each wheel is carried by a crank lever 38 pivoted between its ends on a stub shaft 39 carried by the chassis 4. The crank lever 38 is capable of assuming two limit positions namely a rest position (shown in full lines in Figure 3), in which the wheels 37 are not in contact with the ground, and an operating position, shown at 37' in dot dash lines in which the wheels 37 rest on the ground for supporting a portion of the weight of the vehicle.

The lever 38 is controlled by a hydraulic jack comprising a cylinder 41 in which is slidably mounted a piston 42, (Fig. 2), the rod 43 of which is connected with one end of the lever 38, by means of a pin 44 integral with the rod 43 adapted to slide in a slot 45 (Fig. 3) of the lever 38. A compression spring 40 housed in the cylinder 41 urges the piston 42 in the direction tending to lift each wheel 37 off the ground. Each wheel 37 is controlled by its own hydraulic jack and both of said jacks are actuated by a lever 46 through a suitable sliding valve adapted selectively to feed the jacks with pressure fluid or to unload said jacks, in order simultaneously to bring both additional wheels 37 into either operative or retracted position.

The piston rod 43 of each jack controlling the additional wheels is also used as a locking means between the front and the rear portions of the vehicle in the driving position. For this purpose, the outer end of the rod 43 is adapted to enter complementary recesses 47 provided in chassis 48 of the rear portion of the vehicle. Due to this arrangement, when the additional wheels 37 are in the retracted position, the rear portion of the vehicle is locked to the front portion thereof, while, when said wheels are both in operating position, both portions of the vehicle are automatically released from each other.

Under such conditions, it will be easily understood that, if the additional wheels are both in operating position, the rear portion of the vehicle may be raised. Once the vehicle is in this position, it may be moved forwardly or rearwardly as a whole, being supported by the powered steerable front wheels 6 and by the two additional wheels 37 which are mere non-steerable loosely mounted wheels.

The pivoting support intended to lift the vehicle as a whole essentially comprises four arms 51 carried by a hub 52, and each preferably provided, at its free end, with a hemispherical rubber shoe 53. The hub 52 is secured to the lower end of a rod 54 acting as a piston rod for a hydraulic jack comprised of a piston 55 and a cylinder 56. Aligned and rigid with the rod 54 is a second piston rod 57, while an arm 58, integral with the chassis 4, serves as a support for the upper portion of the cylinder 56. On the other hand, the said cylinder 56 is rotatively fast with the piston 55.

The hydraulic jack 55, 56, which may by controlled for example from a lever 59, thus permits lifting the chassis 4 on the support 51 which rests on the ground, as shown in Figure 5.

Furthermore, there is provided a device for rotating the chassis 4 and, hence, the whole vehicle around the pivot 54, as said vehicle is raised. For this purpose there is used a further hydraulic jack comprising a cylinder 61 and a piston 62. The cylinder 61 is fast with the chassis 4, while rod 63 of the piston 62 is formed as a rack 64 with which meshes a pinion 65 carried by a shaft 66 on which is also keyed a sprocket 67. The sprocket 67 is interconnected, through a chain 68, with another sprocket wheel 69 of smaller diameter, adapted to rotate together with a pinion 71 that meshes with a toothed segment 72 fixedly secured on the cylinder 56. On either side of the piston 62 are disposed centering compression springs 73 urging said piston towards the mid point of its stroke within the cylinder 61. Said hydraulic jack is controlled from a hand lever 74.

It is clear that once pressure fluid has been directed into the jack 55, 56, the vehicle is supported only by the rod 54 carried by the arms 51 which rests on the ground. Under such conditions, as the pressure fluid is admitted at one end of the cylinder 61, or at the other end thereof, the vehicle is angularly displaced as a whole in one direction or in the other, around the vertical rod 54. It will be clear that the magnitude of the angular displacement of the vehicle is a function of the amount of fluid fed into the cylinder.

The control levers 34, 46, 59 and 74 of the hydraulic jacks have been disposed on the dash-board of the vehicle by way of illustration only, and obviously, they may be located at any other suitable place within the reach of the driver.

The operation of the improved vehicle according to the invention is as follows:

In the driving position (Figure 1), the vehicle rests on its four main wheels 6, 6a, in the same manner as a conventional vehicle, and may be driven in the same manner as a conventional vehicle. The two additional wheels 37 are retracted into their uppermost position, and both portions 1 and 2 of the vehicle are safely locked to each other by the rods 43.

If, for example, the vehicle is to be parked between two other vehicles spaced apart, the vehicle is first brought with its front portion 1 up to the available parking space. Then, the lever 46 controlling the jack 41 is actuated to bring the additional wheels 37 into contact with the ground and to unlock the rear portion from the front portion. The lever 34 controlling the jack 32 is then actuated to cause the erection of the rear portion 2 of the vehicle, so as to bring the same into the position shown in Figure 5. The lever 59 is then actuated in turn for controlling the jack 56 and the four arm support 51 is brought in turn into contact with the ground which causes lifting of the whole vehicle as shown in Figure 5. The lever 74 controlling the jack 61 is then actuated so as to orientate the vehicle facing the available parking space. In order to bring the vehicle into said space, the jack 56 is brought back into its initial position to retract the four arm support 51 thus leaving the vehicle supported on its front wheels and its two additional wheels. The engine of the vehicle, then, may be used as usually for parking the same.

By means of combined operations of the type described above, it will be understood that it is possible to bring the present vehicle into very narrow parking spaces. It goes without saying that, before raising the rear portion of the vehicle, it is necessary that the passengers, previously occupying the rear portion, leave the vehicle which is also preferably emptied of any packages. In order to keep a good visibility when the rear portion of the vehicle is raised, there is provided in the same an additional window 81 in register with the windshield 82 of the front portion.

Obviously, for removing the vehicle from a parking space, a reverse sequence of operations should be effected.

There has been described hereabove one embodiment comprising a hydraulic jack 61, 62 for rotating the vehicle around a vertical pivot 54. As an alternative, there has been shown in Figure 1 another embodiment wherein the toothed segment 72 meshes with a pinion 84 driven from an electric motor 85, preferably through a reduction gear (not shown). The pinion 84 acts in the same manner as the pinion 71 of the embodiment of Figures 2 and 3.

Referring now to Figure 6, the vehicle shown therein differs from that of Figure 1 in the rear portion of the vehicle, instead of rolling on a circular path, oscillates around a shaft, and, moreover, the driving means are slightly different.

The rear portion 2' of the vehicle is fixedly secured on a cross-brace 91 of triangular cross-section which is hollow in the example shown. Towards the mid point of the length of the cross-bracing member 91 is fixedly secured one end of an arm 92, the other end of which is adapted to oscillate around a horizontal transverse pivot 92 carried by an arm 94 fast with the chassis 4 of the front portion 1' of the vehicle.

The oscillating motion of the arm 92 is controlled by a hydraulic jack 95, one end of which is pivoted at 95a on the chassis 4, while its other end is pivoted at 95b on the arm 92. The hydraulic jack 95 acts in the same manner as the jack 32 of the embodiment shown in Figure 2. The rear portion 2' of the vehicle, as in the embodiment previously described, may occupy two positions, viz.: the driving position in which the arm 92 takes the position shown in full line and the raised position in which the arm 92 takes the position shown in dot-dash line at 92'.

Otherwise, the design and operation of the vehicle is the same as in the embodiment previously described.

It may be noted that, in both embodiments, when the vehicle is in parking position i.e. when its front portion is raised, it is capable of being moved about very easily, since the wheel base, i.e. the length of the front portion of the vehicle, as determined by the distance between the normal driving front wheels and the loosely mounted additional wheels, is then extremely short. Under these conditions, many evolutions may be effected without even using the four arm support provided to lift the vehicle from the ground for changing its orientation.

In the embodiments of the vehicle according to the present invention, advantage may be taken of the fact that the erected vehicle, or the erected portion of the vehicle, imparts to the vehicle an unusual configuration, on which advertising marks or designs may be disposed, which may be illuminated from the battery of the vehicle e.g. in the shape of rolling curtains, such as shown at 161 and 162 in Figure 5, mounted e.g. on rollers permanently or periodically rotated.

What is claimed is:

1. In a motor car having a body constructed to provide a front section including a pair of supporting wheels and a rear section including a pair of supporting wheels, said front section and said rear section being pivotally interconnected so as to permit pivotal movement of said rear section with respect to said front section about a horizontal transverse axis located on said front section, first power means carried by said body and adapted to pivot said rear section about said axis from a position in which said rear section is in axial alignment with said front section to a position in which said rear section forms an angle with said front section, extensible and retractable auxiliary wheels carried by said front section in longitudinally spaced relation to said supporting wheels thereof, second power means carried by said body and adapted to move said auxiliary wheels into engagement with the ground so that said auxiliary wheels, together with said supporting wheels of the front section are permitted to support said front section for movement over the ground when the supporting wheels of said rear section are cleared of the ground upon pivotal movement of said rear section under the action of said first power means, extensible and retractable carrier means positioned under said front section and operatively connected therewith to raise or to lower said front section relative to the ground, and third power means carried by said body and adapted to move said carrier means into engagement with the ground so that said carrier means is permitted to raise the front section so as to support the latter with its supporting wheels and said auxiliary wheels cleared of the ground.

2. A motor car comprising, in combination, a front body constituting a closed driver compartment, a rear body constituting a closed passenger compartment including a pair of supporting wheels, a motor in said front body, a pair of steerable driving wheels supporting said front body, means to operatively connect the driving wheels with said motor, means for connecting the rear body with the front body in axial alignment therewith while permitting pivotal movement of the rear body with respect to the front body about a horizontal transverse axis located on the front body, first power means in the front body, a rack member secured to the rear body, said rack member being in the form of an arc of a circle, the center of which lies on said transverse axis, a gear mechanism connected to said first power means and including a driving pinion meshing with the rack member whereby the rear body may be pivoted by said first power means through the gear mechanism about said axis between a normal running position in which the rear body is in axial alignment with the front body and a position in which the rear body forms an angle with the front body, means for releasably locking the rear body in the normal running position, extensible and retractable auxiliary supporting wheels carried by said front body in longitudinally spaced relationship to said driving wheels, second power means in the front body, a driving connection between the second power means and said auxiliary supporting wheels to move the latter into engagement with the ground, extensible and retractable carrier means positioned under said front body and operatively connected therewith to raise or to lower said front body relative to the ground, third power means in the front body, and a driving connection between the third power means and the carrier means to move the latter into engagement with the ground and to cause said carrier means to raise said front body so as to clear said driving wheels and auxiliary supporting wheels from the ground.

References Cited in the file of this patent

UNITED STATES PATENTS

| 1,594,687 | Pelton | Aug. 3, 1926 |
| 1,731,757 | Tubbe | Oct. 15, 1929 |
| 2,235,595 | Stein | Mar. 18, 1941 |

FOREIGN PATENTS

| 365,030 | Great Britain | Jan. 14, 1932 |